J. F. REASIN.
Plow-Cleaner.
No. 7,274.
Patented Apr. 9, 1850.
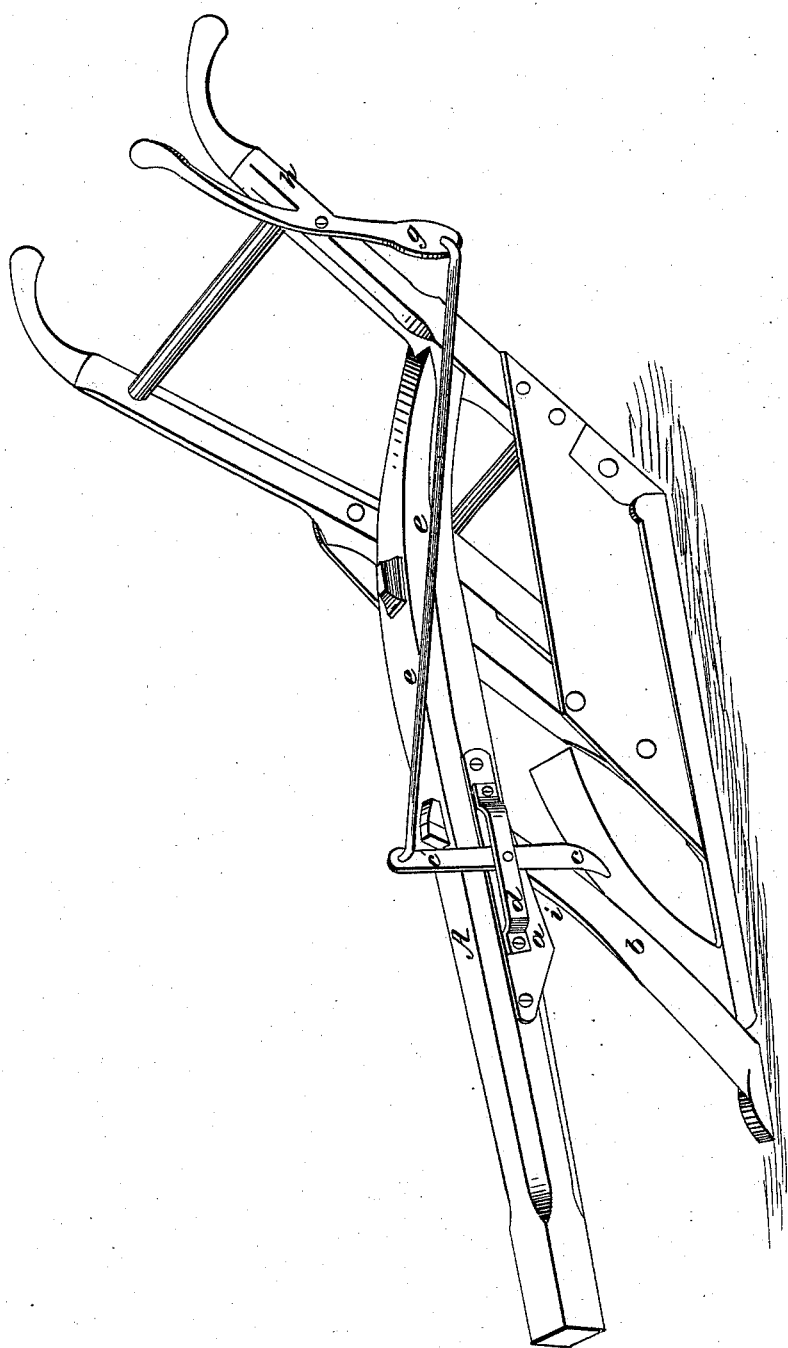

UNITED STATES PATENT OFFICE.

JAMES F. REASIN, OF DARLINGTON, MARYLAND.

IMPROVEMENT IN PLOW-CLEANERS.

Specification forming part of Letters Patent No. 7,274, dated April 9, 1850.

*To all whom it may concern:*

Be it known that I, JAMES F. REASIN, of Darlington, in the county of Harford and State of Maryland, have invented a new and useful Improvement in Plows; and I do hereby declare that the following is a full, clear, and exact description of my plow-cleaner, reference being had to the accompanying drawing, which forms part of this specification, and represents a view in perspective of a plow with my improvement applied thereto.

My invention consists in a device for cleansing plows or standards, which is composed of a stationary share-blade attached to the plow-beam and projecting forward from the colter, and of a corresponding movable share-blade adapted thereto, which can be operated, when necessary, by the hand of the plowman in such manner that the weeds or other obstructions which are continually accumulating in the angle formed by the beam and the colter are divided into two portions, which fall to the ground on each side of the colter and leave it free to pass through the sod.

In the plow represented in the drawing the stationary share-blade $a$ is secured to the side of the beam $A$ and projects forward of the colter $b$. A movable share blade, $c$, is pivoted to the stationary one, the outer extremity of the pivot being supported by an iron strap, $d$. The shank $c'$ of this movable blade is connected by a rod, $e$, with the lower extremity of a hand-lever, $g$, pivoted to one of the handles $h$ of the plow.

When the plow is in use the several members of the device occupy the positions in which they are represented in the drawing. If weeds, brush, or other obstructions accumulate at the angle $i$ of the colter to impede its action, the hand of the driver is applied to force the upper extremity of the hand-lever forward, and this lever, acting through the rod $e$ upon the movable share-blade, forces its cutting-edge against the mass of rubbish, which, being included between the two share-blades, is divided into two portions, which fall on each side of the advancing plow and leave the colter free to act upon the sod. When the mass is divided the movable share-blade is returned to its first position by drawing back the upper extremity of the hand-lever.

This device is applicable to all descriptions of plows without materially changing their form and arrangement. It may also be constructed and operated in various ways without affecting the principle of the invention.

Having thus described my invention, what I claim therein as new, and desire to secure by Letters Patent, is—

The plow-cleanser constructed of two share-blades, substantially as herein set forth, for the purpose of cutting in two the weeds and other obstructions which accumulate upon the colter, and thus detaching them therefrom.

In testimony whereof I have hereunto signed my name this 12th day of December aforesaid.

JAS. F. REASIN.

Witnesses:
P. H. WATSON,
E. S. RENWICK.